United States Patent
Lin et al.

(10) Patent No.: US 9,871,847 B2
(45) Date of Patent: Jan. 16, 2018

(54) DATA-SHARING SYSTEM AND METHOD

(71) Applicant: Quanta Computer Inc., Taoyuan (TW)

(72) Inventors: Meng-Jou Lin, Taoyuan (TW); Jung-Shen Lee, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 190 days.

(21) Appl. No.: 14/943,405

(22) Filed: Nov. 17, 2015

(65) Prior Publication Data

US 2017/0041376 A1 Feb. 9, 2017

(30) Foreign Application Priority Data

Aug. 7, 2015 (TW) .............................. 104125745 A (51) Int. Cl.
*H04L 29/08* (2006.01)
*H04L 29/06* (2006.01)

(52) U.S. Cl.
CPC .......... *H04L 67/06* (2013.01); *H04L 65/4069* (2013.01); *H04L 67/1097* (2013.01)

(58) Field of Classification Search
CPC .. H04L 65/4069; H04L 67/06; H04L 67/1097
See application file for complete search history.

(56) References Cited

U.S. PATENT DOCUMENTS

2007/0153740 A1* 7/2007 Chang ............... H04L 29/06027 370/331
2014/0115115 A1* 4/2014 Kuang ................ H04L 65/1083 709/219
2015/0022666 A1* 1/2015 Kay ...................... H04L 67/025 348/159
2015/0146995 A1 5/2015 Gohshi
2015/0178280 A1* 6/2015 DiMaria ................. H04L 65/60 707/736
2015/0358666 A1* 12/2015 Atake ................ H04N 21/4122 725/88

FOREIGN PATENT DOCUMENTS

TW 201305830 2/2013
TW 201507447 2/2015

OTHER PUBLICATIONS

Chinese language office action dated Apr. 14, 2016, issued in application No. TW 104125745.

* cited by examiner

*Primary Examiner* — Arvin Eskansarina
*Assistant Examiner* — Gil H. Lee
(74) *Attorney, Agent, or Firm* — McClure, Qualey & Rodack, LLP (57) ABSTRACT

The present invention provides a data-sharing system, including a media server, a first device and a second device. The media server has a media server address and is configured to store at least one media file. The first device is configured to download the media file from the media server according to the media server address, and play the media file on a media player program. The first device further outputs file information corresponding to the media file according to a switching signal. The second device is configured to receive the file information from the first device, stream the media file from the media server according to the file information, and play the media file on the media player program.

4 Claims, 8 Drawing Sheets

DATA-SHARING SYSTEM AND METHOD

CROSS REFERENCE TO RELATED APPLICATIONS

This Application claims priority of Taiwan Patent Application No. 104125745, filed on Aug. 7, 2015, the entirety of which is incorporated by reference herein.

BACKGROUND OF THE INVENTION

Field of the Invention

The application relates in general to a data-sharing system and a data-sharing method, in particular for sharing media files from one device to another device, which allows the media file to be streamed from a media server according to file information and play on the other device continuously.

Description of the Related Art

These days, due to the rapid development of the Internet, sharing resources through the Internet has become more and more popular. However, when a user wants to share a large file from one terminal to another, the user first needs to upload the file from the terminal to a server, and then download the file from the server to another terminal, which might take a lot of time in uploading and downloading. In addition, when the user shares the resource, it may create the risk of potential copyright violation, because the file must be entirely uploaded. Thus, how to share the file in an easy way without weakening copyright protection is a problem which needs to be solved immediately.

BRIEF SUMMARY OF INVENTION

An embodiment of the present invention provides a data-sharing system, including a media server, a first device and a second device. The media server has a media server address and is configured to store at least one media file. The first device is configured to download the media file from the media server according to the media server address, and play the media file using a media player program. The first device further outputs file information corresponding to the media file according to a switching signal. The second device is configured to receive the file information from the first device, stream the media file from the media server according to the file information, and play the media file on the media player program.

Another embodiment of the present invention provides a data-sharing method, including: downloading a media file from a media server according to a media server address corresponding to the media server using a first device; playing the media file through a media player program via the first device; receiving a switching signal on the first device; outputting file information corresponding to the media file to a second device according to the switching signal; streaming the media file from the media server according to the file information using the second device; and playing the media file according to the file information through the media player program using the second device.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Further areas to which the present systems and methods can be applied will become apparent from the detailed description provided herein. It should be understood that the detailed description and specific examples, while indicating exemplary embodiments of the data-sharing system and the data-sharing method, are intended for the purposes of illustration only and are not intended to limit the scope of the invention.

Figure 1:
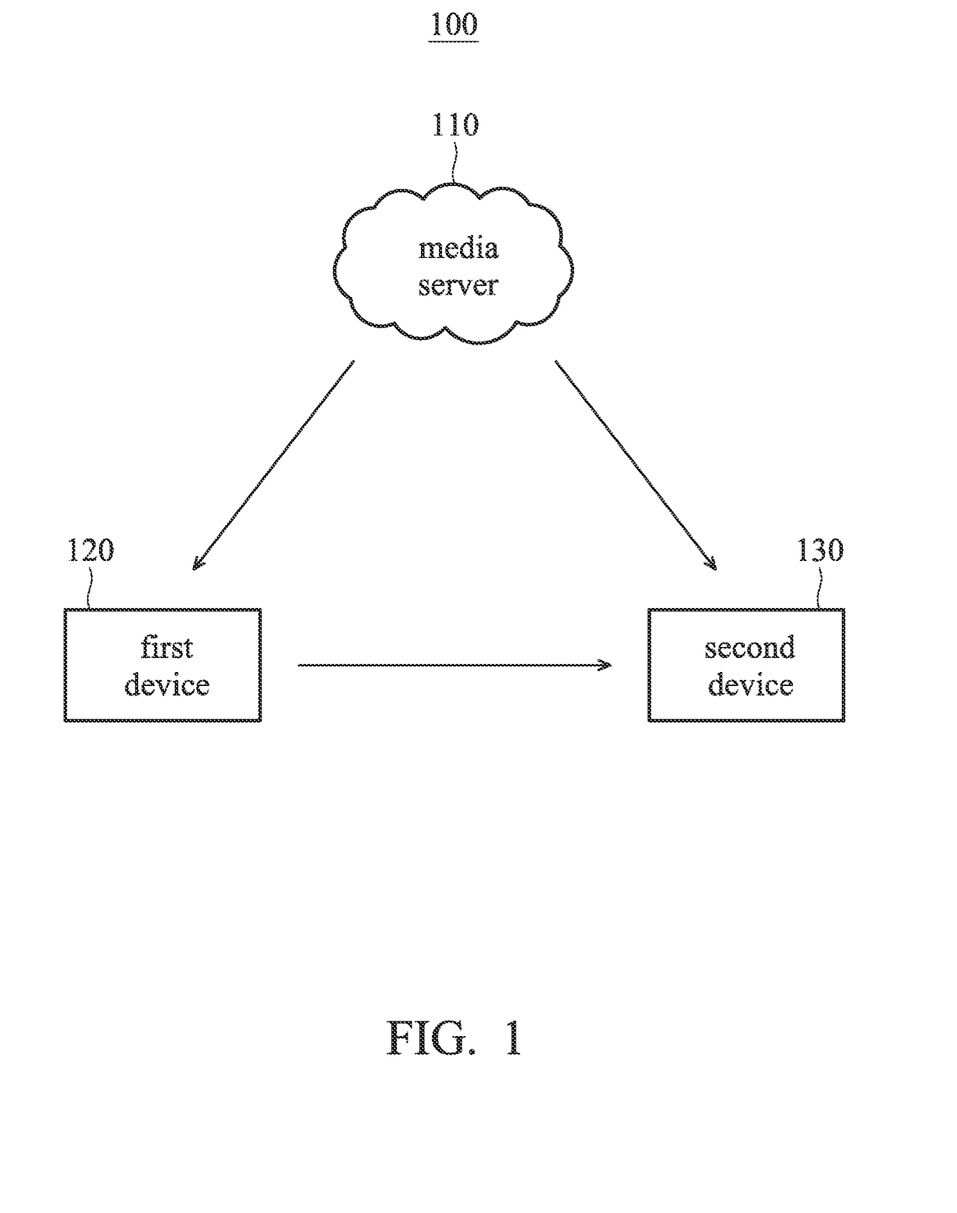
FIG. 1 is a schematic diagram of the data-sharing system in accordance with an embodiment of the invention.

FIG. 1 is a schematic diagram of the data-sharing system in accordance with an embodiment of the invention. The data-sharing system 100 includes a media server 110, a first device 120, and a second device 130. The media server 110 is used to store a plurality of media files, and can be a Network drive or a Cloud space, such as Dropbox, Google Drive, iCloud, which has a media server address. The media file can be a graphics file, an audio file, or an image file. The first device 120 and the second device 130 can be any computer device, smart device, or portable device which is able to connect to the Internet and connect to the media server 110 according to the media server address through the Internet or the local area network. In the embodiment, the media server 110, the first device 120, and the second device 130 are in the same local area network, and the first device 120 stores a second address corresponding to the second device 130.

It should be noted that the configuration of the media server, the first device, and the second device which are disclosed in different embodiments of the invention is the same as the configuration of the media server 110, the first device 120, and the second device 130. It will not be described again in the following embodiment.

In the embodiments, the first device 120 connects to the media server 110 according to the media server address, streams the media file from the media server 110, and plays the media file with a media player program. When the user wants to play the media file on the second device 130, the user can confirm the connection of the second device 130 first using a user interface on the first device 120. After the user confirms that the first device 120 has connected to the second device 130, meaning that the first device 120 connects to the second device 130 according to the second address corresponding to the second device 130, the user can stop playing the media file by touching a switching icon or pressing a physical button, and play the media file on the second device 130 by triggering a switching signal. The first device 120 outputs the file information corresponding to the media file to the second device 130 according to the switching signal. The file information includes a file name, a file path corresponding to the media file in the media server 110, a playback position of the media file, the media server address, and the type of media file, etc. The second device 130 connects to the media server 110 according to the media server address, streams the media file according to the file path corresponding to the media file in the media server 110, and continues to play the media file on the second device 130 according to the type and playback position of the media file via the media player program.

Figure 2:
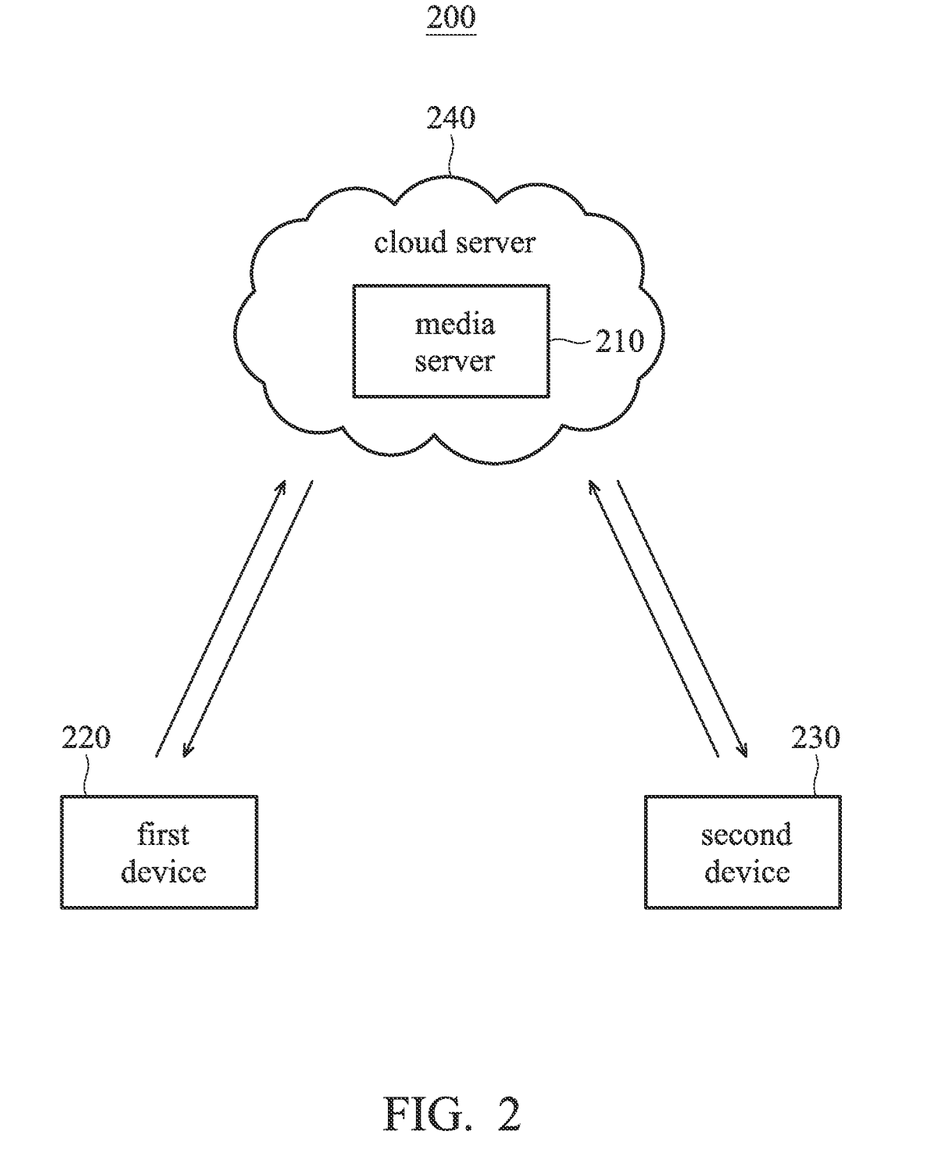
FIG. 2 is a schematic diagram of the data-sharing system in accordance with another embodiment of the invention.

FIG. 2 is a schematic diagram of the data-sharing system in accordance with another embodiment of the invention. The data-sharing system 200 includes a media server 210, a first device 220, a second device 230, and a cloud server 240. The media server 210 is included in the cloud server 240, and the cloud server 240 stores the second address corresponding to the second device 230. For example, the second device 230 is registered on the cloud server 240, and the cloud server 240 is able to connect to the second device 230. The first device 220 connects to the cloud server 240 according to the cloud server address corresponding to the cloud server 240, and outputs the file information to the second device 230 through the cloud server 240. The second device 230 streams the media file from the media server 210 within the cloud server 240 according to the file path corresponding to the media file in the media server 210. The second device 230 continues to play the media file on the second device 230 according to the type and playback position of the media file using the media player program.

Figure 3:
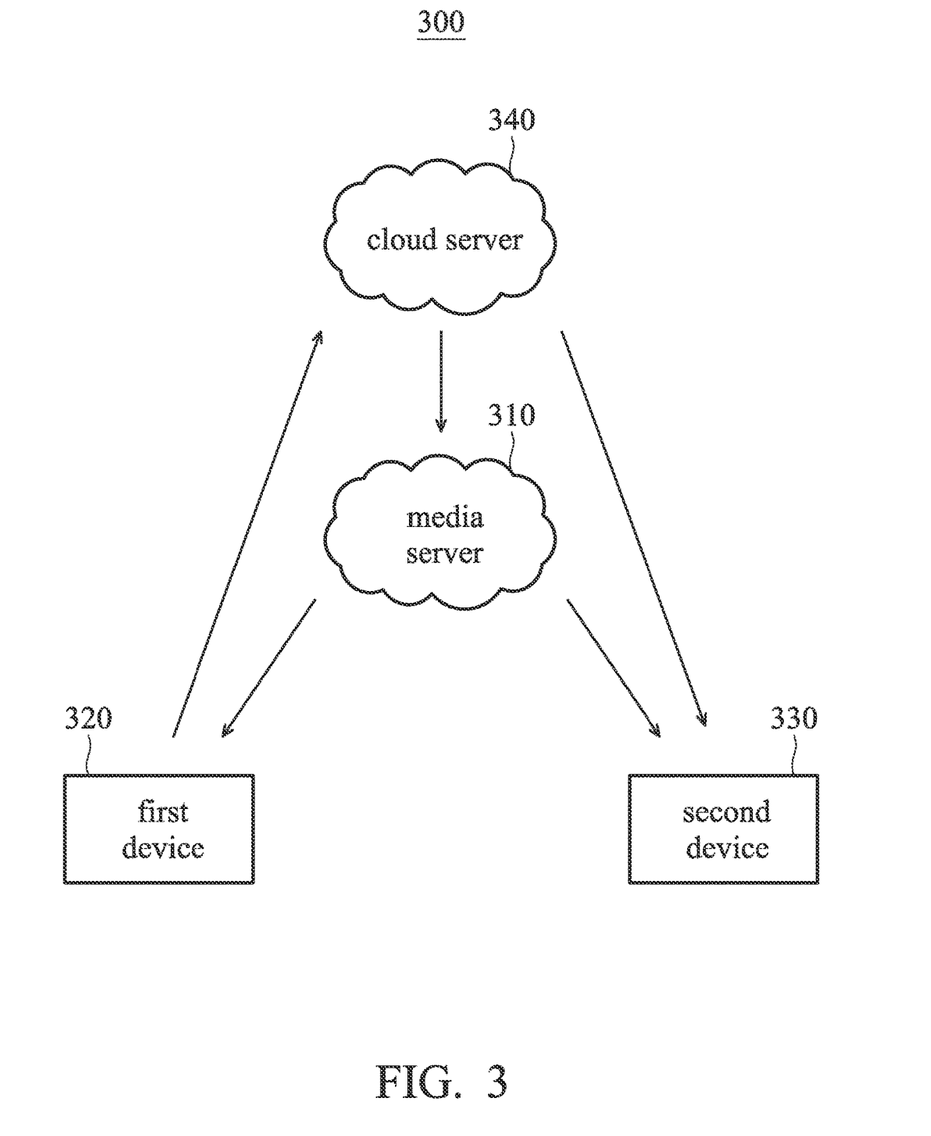
FIG. 3 is a schematic diagram of the data-sharing system in accordance with another embodiment of the invention.

FIG. 3 is a schematic diagram of the data-sharing system in accordance with another embodiment of the invention. The data-sharing system 300 includes a media server 310, a first device 320, a second device 330, and a cloud server 340. In the embodiment, the difference between the data-sharing system 300 and the data-sharing system 200 is that the user can choose a media server 310 that is not built in the cloud server 340, and the cloud server 340 is able to control access to the media server 310. For example, when the user wants to play a media file on the second device 330, the first device 320 connects to the cloud server 340 according to the cloud server address corresponding to the cloud server 340, and outputs file information to the second device 330 according to the switching signal through the cloud server 340. In addition, the cloud server 340 further outputs login information corresponding to the media server 310 to the second device 330 according to the switching signal. The second device 330 connects to the media server 310 according to the login information, and accesses the media file from the media server 310 according to the file information. The login information includes a user account and a password for the media server 310. The second device 330 continues to play the media file according to the type and playback position of the media file using the media player program after streaming the media file.

Figure 4:
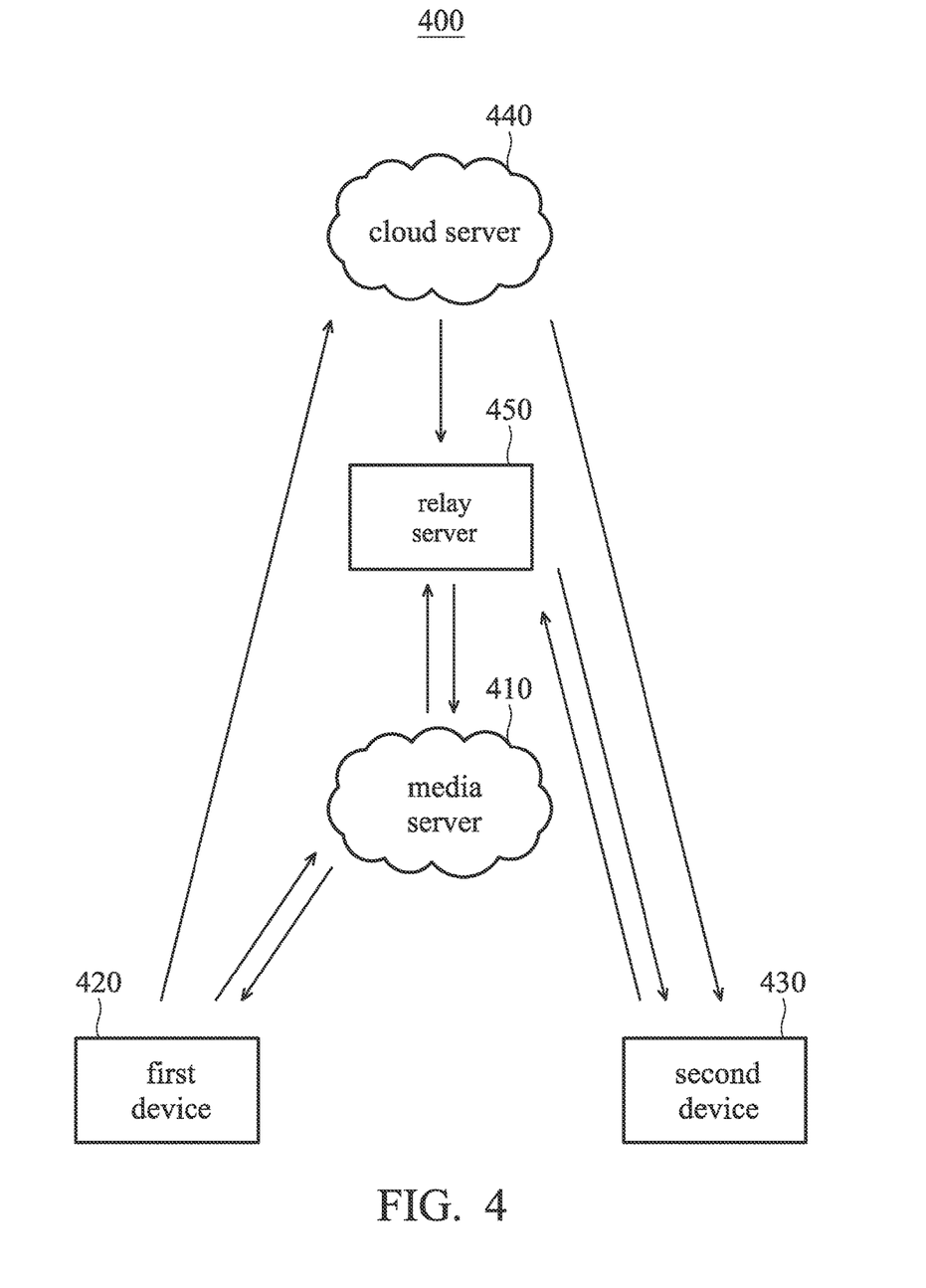
FIG. 4 is a schematic diagram of the data-sharing system in accordance with another embodiment of the invention.

FIG. 4 is a schematic diagram of the data-sharing system in accordance with another embodiment of the invention. As shown in FIG. 4, the data-sharing system 400 includes a media server 410, a first device 420, a second device 430, a cloud server 440, and a relay server 450. Because a firewall is set between the second device 430, the media server 410, and the first device 420, which renders the media file unable to stream from the media server 410 to the second device 430. Thus, the relay server 450 is needed to break through the firewall for transmitting the media file.

When the user wants to play the media file on the second device 430, the first device 420 outputs the file information to the second device 430 according to the switching signal through the cloud server 440, the cloud server 440 further outputs the second address corresponding to the second device 430 to the relay server 450 according to the switching signal. The relay server 450 connects to the second device 430 according to the second address. In addition, the first device 420 further outputs a transmission signal corresponding to the switching signal to the media server 410 for notifying the media server 410 to connect with the relay server 450 for outputting the media file. The second device 430 outputs the access request to the media server according to the file information through the relay server 450, and the media server 410 streams the media file to the second device 430 by breaking through the firewall through the relay server 450 according to the access request. It is unnecessary to download the media file in advance, and the second device 430 continues to play the media file according to the type and playback position of the media file on the media player program after streaming the media file.

Figure 5:
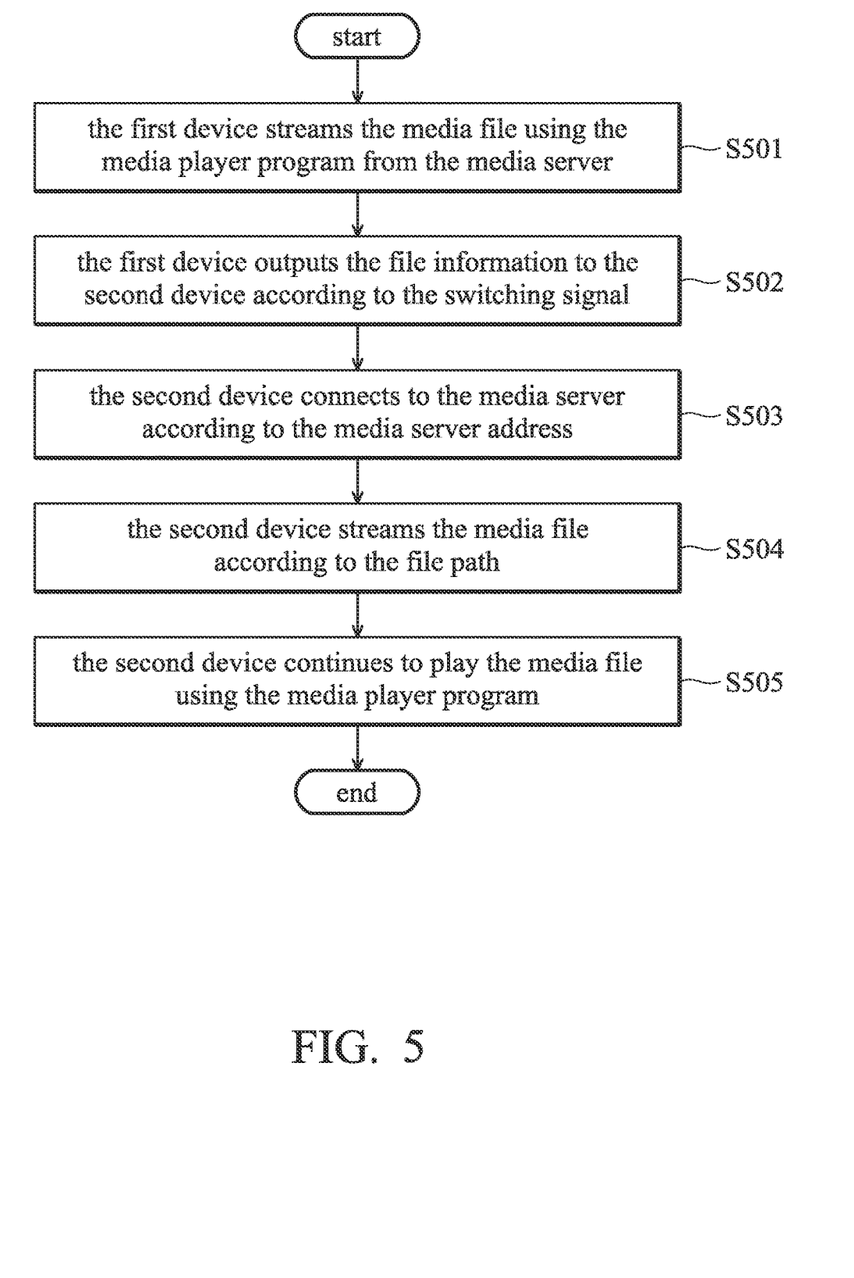
FIG. 5 is a flow chart of the data-sharing method in accordance with an embodiment of the invention.

Please refer to FIG. 5 with FIG. 1. FIG. 5 is a flow chart of the data-sharing method in accordance with an embodiment of the invention. In step S501, the first device 120 streams and plays the media file according to the media server address on the media player program from the media server 110. In step S502, the first device 120 outputs the file information corresponding to the media file to the second device 130 according to the switching signal. The file information includes the file name, the file path corresponding to the media file in the media server 110, the playback position of the media file, the media server address, and the type of media file, etc. In step S503, the second device 130 connects to the media server 110 according to the media server address. In step S504, the second device 130 streams the media file according to the file path from the media server 110. In step S505, the second device 130 continues to play the media file on the second device 130 according to the type and playback position of the media file using the media player program.

Figure 6:
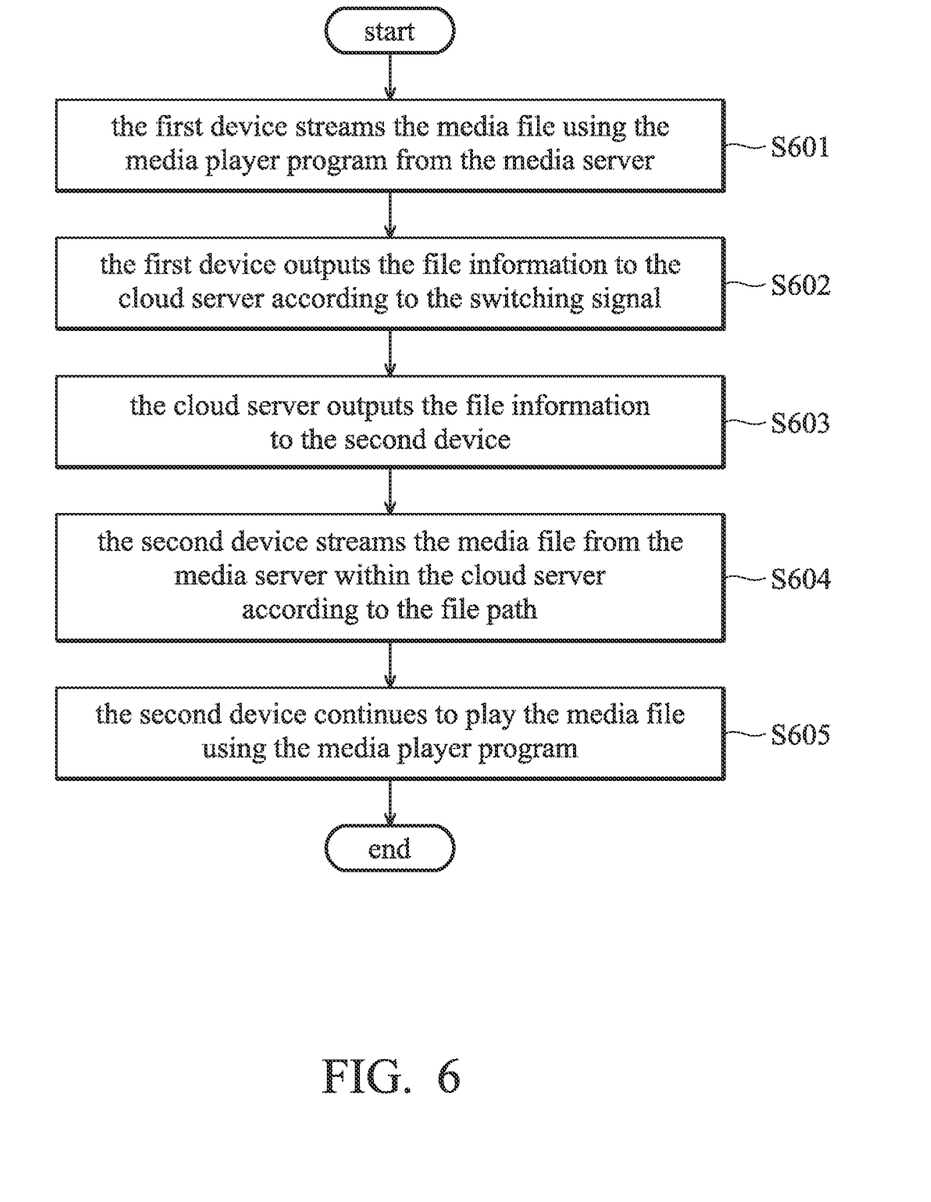
FIG. 6 is a flow chart of the data-sharing method in accordance with another embodiment of the invention.

Please refer to FIG. 6 with FIG. 2. FIG. 6 is a flow chart of the data-sharing method in accordance with another embodiment of the invention. In step S601, the first device 220 streams and plays the media file according to the media server address using the media player program from the media server 210. In step S602, the first device 220 outputs the file information corresponding to the media file to the cloud server 240 according to the switching signal. The media server 210 is included in the cloud server 240, and the cloud server 240 stores the second address corresponding to the second device 230. In step S603, the cloud server 240 outputs the file information to the second device 230. The file information includes the file name, the file path corresponding to the media file in the media server 210, the playback position of the media file, the media server address, and the type of media file, etc. In step S604, the second device 230 streams the media file from the media server 210 within the cloud server 240 according to the file path corresponding to the media file in the media server 210. In step S605, the second device 230 continues to play the media file on the second device 230 according to the type and playback position of the media file using the media player program.

Figure 7:
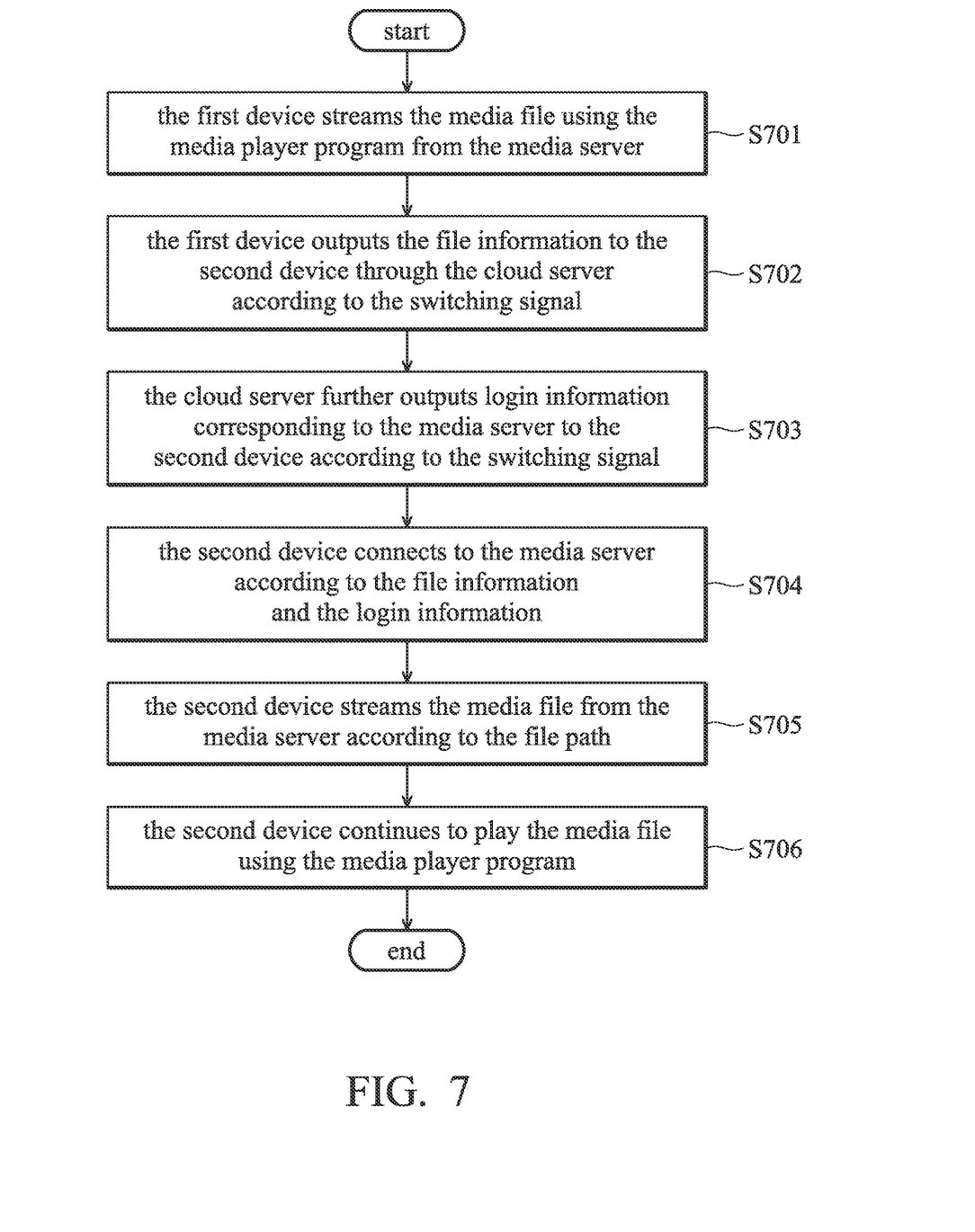
FIG. 7 is a flow chart of the data-sharing method in accordance with another embodiment of the invention.

Please refer to FIG. 7 with FIG. 3. FIG. 7 is a flow chart of the data-sharing method in accordance with another embodiment of the invention. In step S701, the first device 320 streams and plays the media file according to the media server address using the media player program from the media server 310. In step S702, the first device 320 outputs the file information corresponding to the media file to the cloud server 340 according to the switching signal. The cloud server 340 stores the second address corresponding to the second device 330. In step S703, the cloud server 340 further outputs login information corresponding to the media server 310 to the second device 330 according to the switching signal. In step S704, the second device 330 connects to the media server 310 according to the file information and the login information. The file information includes the file name, the file path corresponding to the media file in the media server 310, the playback position of the media file, the media server address, and the type of media file, etc. In step S705, the second device 330 streams the media file from the media server 310 according to the file path of the media file within the media server 310. In step S706, the second device 330 continues to play the media file according to the type and playback position of the media file using the media player program after streaming the media file.

Figure 8:
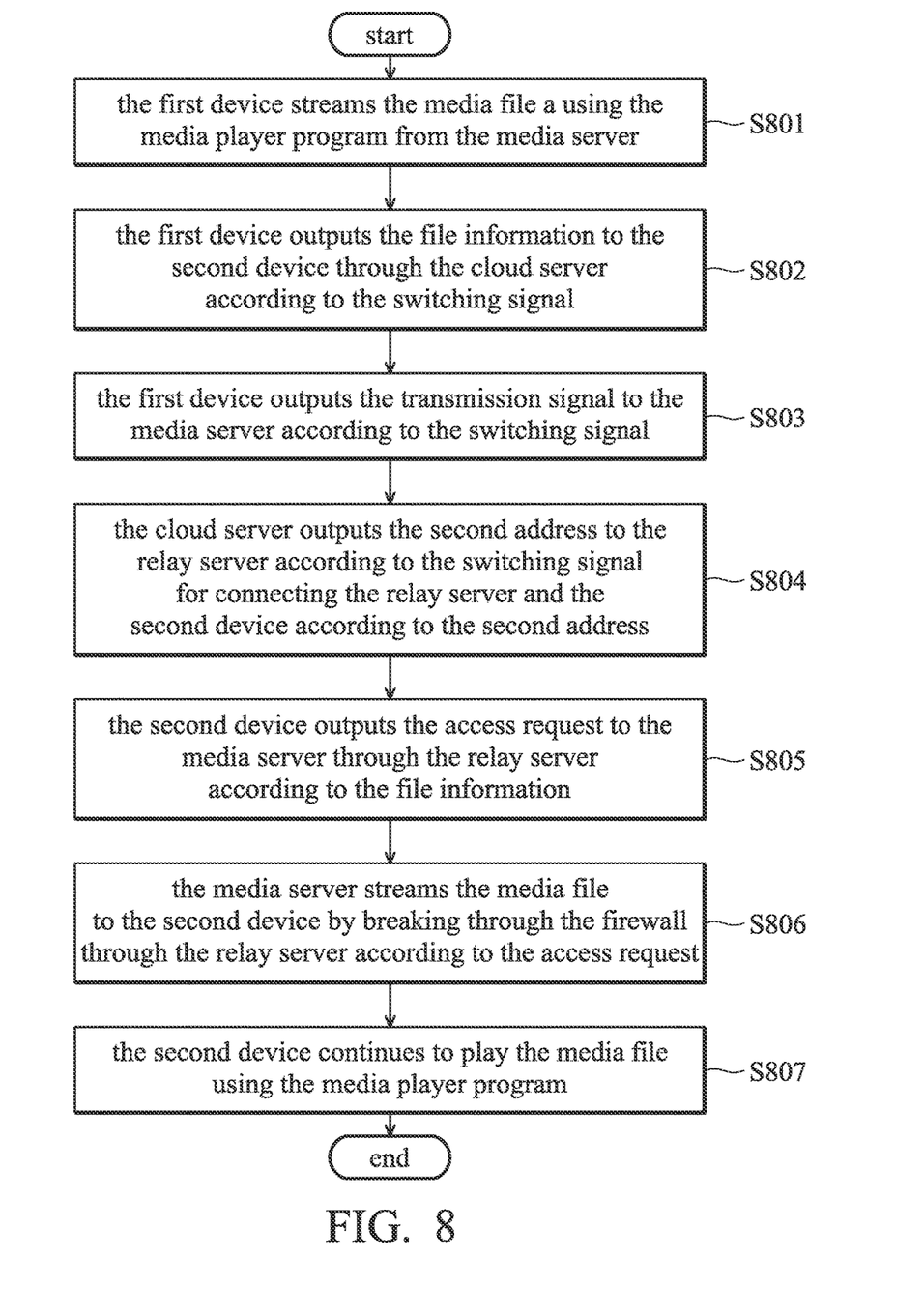
FIG. 8 is a flow chart of the data-sharing method in accordance with another embodiment of the invention.

Please refer to FIG. 8 with FIG. 4. FIG. 8 is a flow chart of the data-sharing method in accordance with another embodiment of the invention. In step S801, the first device 420 streams and plays the media file according to the media server address using the media player program from the media server 410. In step S802, the first device 420 outputs the file information corresponding to the media file to the second device 430 through the cloud server 440 according to the switching signal. The cloud server 440 stores the second address corresponding to the second device 430. In step S803, the first device 420 further outputs the transmission signal to the media server 410 according to the switching signal for notifying the media server 410 to connect with the relay server 450 for outputting the media file. In step S804, the cloud server 440 outputs the second address to the relay server 450 according to the switching signal for connecting the relay server 450 and the second device 430 according to the second address. In step S805, the second device 430 outputs the access request to the media server 410 through the relay server 450 according to the file information. In step S806, the media server 410 streams the media file to the second device 430 by breaking through the firewall through the relay server 450 according to the access request. In step S807, the second device 430 continues to play the media file according to the type and playback position of the media file using the media player program after streaming the media file.

As described above, an embodiment of the invention provides a data-sharing system and a data-sharing method allowing a user to transmit a file and data from one device to another through the cloud so that the media file can be played continuously in a situation where two of the devices are not in the same local area network. In addition, the user is allowed to transmit the file and the data by using the relay server when there is a firewall, so that the user can use remote access according to the embodiments of the present invention.

It will be apparent to those skilled in the art that various modifications and variations can be made to the structure disclosed without departing from the scope or spirit of the invention. In view of the foregoing, it is intended that the present invention covers modifications and variations of this invention, provided they fall within the scope of the following claims and their equivalents.

What is claimed is:

1. A data-sharing system, comprising:
   a media server, which has a media server address, configured to store at least one media file;
   a first device, configured to download the media file from the media server according to the media server address, play the media file using a media player program, and output file information corresponding to the media file according to a switching signal; and
   a second device, configured to receive the file information from the first device, stream the media file from the media server according to the file information, and play the media file on the media player program; and
   a cloud server, which has a cloud server address, configured to connect to the second device according to a second address corresponding to the second device, and output login information to the second device according to the switching signal;
   wherein the first device outputs the file information to the second device according to the switching signal and the cloud server address, and outputs the login information to the media server according to the media server address, and the second device connects to the media server according to the file information and the login information, streams the media file from the media server, and plays the media file according to the file information using the media player program; and
   wherein the file information comprises a file name, a file path, a playback position, and the media server address.

2. A data-sharing system, comprising:
   a media server, which has a media server address, configured to store at least one media file;
   a first device, configured to download the media file from the media server according to the media server address, play the media file using a media player program, and output file information corresponding to the media file according to a switching signal; and
   a second device, configured to receive the file information from the first device, stream the media file from the media server according to the file information, and play the media file on the media player program;
   a cloud server, which comprises a cloud server address, configured to connect to the second device according to a second address corresponding to the second device; and
   a relay server, configured to receive the second address from the cloud server, and connect to the second device according to the second address;
   wherein the first device outputs the file information to the second device according to the switching signal and the cloud server address, and outputs a transmission signal to the media server, the media server breaks through a firewall according to the transmission signal via the relay server for streaming the media file to the second device, and the second device plays the media file on the media player program; and
   wherein the file information comprises a file name, a file path, a playback position, and the media server address.

3. A data-sharing method, comprising:
   downloading a media file from a media server according to a media server address corresponding to the media server using a first device;
   playing the media file through a media player program using the first device;
   receiving a switching signal on the first device;
   outputting file information corresponding to the media file to a second device according to the switching signal and a cloud server address corresponding to a cloud server, wherein the cloud server connects to the second device according to a second address corresponding to the second device, and outputs login information to the second device according to the switching signal;

connecting the second device and the media server according to the file information and the login information via the second device;
streaming the media file from the media server according to the file information using the second device; and
playing the media file according to the file information through the media player program using the second device;
wherein the file information comprises a file name, a file path, a playback position, and the media server address.

4. A data-sharing method, comprising:
downloading a media file from a media server according to a media server address corresponding to the media server using a first device;
playing the media file through a media player program using the first device;
receiving a switching signal on the first device;
outputting file information corresponding to the media file to a second device according to the switching signal and a cloud server address corresponding to a cloud server, wherein the cloud server connects to the second device according to a second address corresponding to the second device;
receiving the second address from the cloud server through a relay server;
connecting to the second device according to the second address through the relay server;
outputting a transmission signal to the media server according to the switching signal using the first device;
breaking through a firewall according to the transmission signal using the relay server for streaming the media file to the second device; and
playing the media file according to the file information through the media player program using the second device;
wherein the file information comprises a file name, a file path, a playback position, and the media server address.

* * * * *